(12) United States Patent
Worger et al.

(10) Patent No.: US 6,173,156 B1
(45) Date of Patent: Jan. 9, 2001

(54) GLOBAL MESSAGE DELIVERY SYSTEM AND METHOD USING GEO AND NON-GEO SATELLITES

(75) Inventors: William R. Worger, Gilbert; Gerald J. Hogg, Fountain Hills; James Edward Greenwood, Jr., Scottsdale, all of AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/072,061

(22) Filed: May 4, 1998

(51) Int. Cl.[7] .................................................. H04B 7/185
(52) U.S. Cl. ..................... 455/13.1; 455/12.1; 455/427; 455/428; 455/430; 455/453
(58) Field of Search .................. 455/13.1, 12.1, 455/453, 427, 430, 428, 13.4

(56) References Cited

U.S. PATENT DOCUMENTS

| | | | |
|---|---|---|---|
| 5,414,432 | * | 5/1995 | Penny, Jr. et al. .............. 342/357.16 |
| 5,490,087 | * | 2/1996 | Redden et al. ........................ 455/427 |
| 5,612,701 | * | 3/1997 | Diekelman ........................... 342/354 |
| 5,625,868 | * | 4/1997 | Jan et al. ............................. 455/13.4 |
| 5,812,538 | * | 9/1998 | Wiedeman et al. ................... 370/316 |
| 5,887,257 | * | 3/1999 | Olds ..................................... 455/427 |
| 5,924,015 | * | 7/1999 | Garrison et al. ..................... 455/13.4 |
| 5,937,352 | * | 8/1999 | Courtney et al. ..................... 455/435 |
| 5,956,644 | * | 9/1999 | Miller et al. ......................... 455/453 |
| 5,957,409 | * | 9/1999 | Castiel et al. ................... 244/158 R |
| 5,991,279 | * | 11/1999 | Haugli et al. ........................ 370/311 |

* cited by examiner

Primary Examiner—Dwayne D. Bost
Assistant Examiner—Temica M. Davis
(74) Attorney, Agent, or Firm—Gregory J. Gorrie; James E. Klekotka (57) ABSTRACT

A message processing center (140) is used in a global message delivery system. Message processing center (140) uses at least one GEO satellite (130) and at least one Non-GEO satellite (120) to delivers messages (pages) to a number of ground stations (110) located at various locations on the surface of the earth. Message processing center (140) determines loading for at least one GEO satellite (130) and at least one Non-GEO satellite (120). Message processing center (140) determines available capacity for at least one GEO satellite (130) and at least one Non-GEO satellite (120). Message processing center (140) uses a number of criteria to optimize the delivery of the message data.

12 Claims, 4 Drawing Sheets

GLOBAL MESSAGE DELIVERY SYSTEM AND METHOD USING GEO AND NON-GEO SATELLITES

FIELD OF THE INVENTION

The present invention relates generally to satellite communication systems. Specifically, the present invention relates to geosynchronous (GEO) and Non-geosynchronous (Non-GEO) satellites and more specifically global message delivery systems.

BACKGROUND OF THE INVENTION

Communication systems have been developed using terrestrial based and space based equipment in which subscribers use various devices (e.g., a cellular telephone or pager) to communicate with other subscribers within the communication system. These devices communicate with the system via several communications processes, each involving an exchange of messages between the subscriber and the system.

In some cases, communication systems have been established using Geosynchronous (GEO) satellites, and in other cases, communications systems have been established using Non-Geosynchronous (Non-GEO) satellites. In some existing satellite communications systems, message delivery services are provided for registered subscribers. Registration is necessary to keep track of the subscribers so that the system knows where to send messages for a particular subscriber.

However, existing satellite systems do not provide access to both GEO and Non-GEO satellites. Message delivery systems could become more efficient if both GEO and Non-GEO satellites were used. Procedures for allowing simultaneous access to GEO and Non-GEO satellites should provide an efficient use of satellite resources to deliver messages worldwide.

Thus, what are needed are a method and apparatus for using GEO and Non-GEO satellites to deliver messages (pages) on a global basis. What is also needed is an improved message delivery system and method.

DETAILED DESCRIPTION OF A PREFERRED EMBODIMENT

The method and apparatus of the present invention, among other things, uses GEO and Non-GEO satellites to deliver messages (pages) on a global basis. As used herein, the terms "message" and "page" are not intended to be limited to any particular mode of generation and include those created by either terrestrial or satellite cellular communications systems and/or combinations thereof. The present invention is applicable to communications systems that include both terrestrial-based and space-based resources. Non-GEO satellites can include satellites having low-earth and medium-earth orbits.

Figure 1:
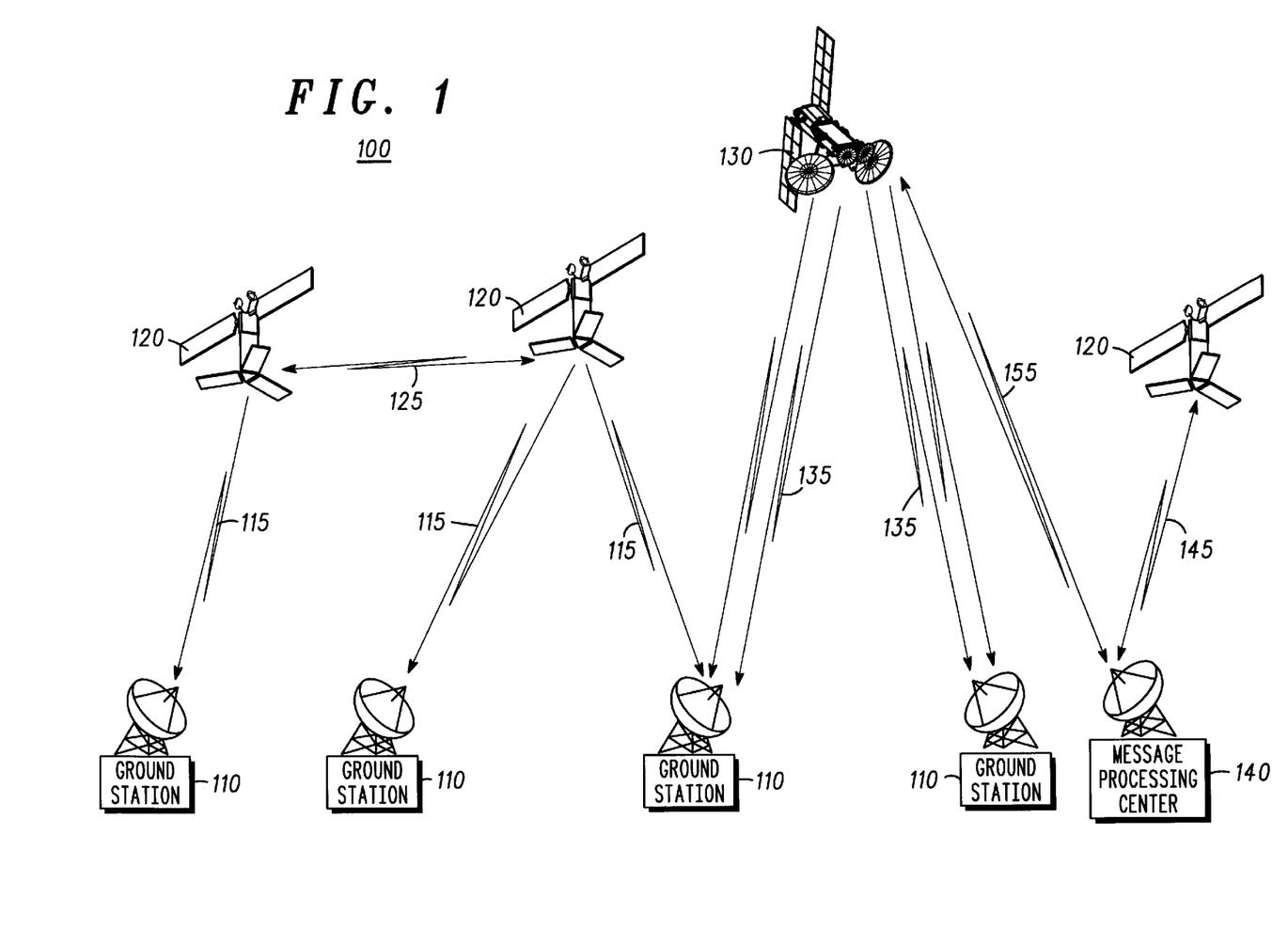
FIG. 1 illustrates a highly simplified diagram of a global message delivery system in accordance with a preferred embodiment of the present invention.

FIG. 1 illustrates a highly simplified diagram of a global message delivery system in accordance with a preferred embodiment of the present invention. Global message delivery system 100 comprises ground stations (GS) 110, Non-GEO satellites 120, GEO satellite 130, and message processing center 140.

For clarity, FIG. 1 illustrates a single GEO satellite 130 and three Non-GEO satellites 120. This is done to facilitate the explanation of the invention. Different numbers of Non-GEO and GEO satellites can be used. While the present invention is advantageously employed when a large number of Non-GEO satellites are being used, it is also applicable with as few as a single Non-GEO satellite.

In a preferred embodiment, Non-GEO satellites 120 orbit earth at various altitudes. For example, Non-GEO satellites include Low Earth Orbit (Non-GEO) and Medium Earth Orbit (MEO) satellites.

Non-GEO satellites 120 communicate with ground stations 110 using communication links 115. Because of the relative movement between Non-GEO satellites 120 and ground stations 110, communication links 115 are temporary and hand-off schemes are employed to realize continuous communication channels between ground stations 110 and Non-GEO satellites 120.

Non-GEO satellites 120 communicate with message processing center 140 using communication links 145. Because of the relative movement between Non-GEO satellites 120 and message processing center 140, communication link 145 is temporary and hand-off schemes are employed to realize continuous communication channels between message processing center 140 and Non-GEO satellites 120.

Non-GEO satellites 120 communicate with other Non-GEO satellites 120 using crosslinks 125. Thus, message can be routed through a constellation of Non-GEO satellites 120 to within range of substantially any other point on the surface of the earth. A message can be routed down to ground station 110 on or near the surface of the earth from Non-GEO satellites 120 using link 115.

In a preferred embodiment, a message can also be routed down to ground station 110 from GEO satellite 130 through links 135. GEO satellite 130 communicates with ground stations 110 using communication links 135. Link 135 is illustrated as a uni-directional link. This is not required for the invention. In alternate embodiments, link 135 can be a bi-directional link. GEO satellite 130 communicates with message processing center 140 using communication links 155. Link 155 is illustrated as a bi-directional link. This is not required for the invention. In alternate embodiments, link 155 can be a uni-directional link.

Message processing center 140 can be a system control center or be connected to one or more system control centers. Message processing center 140 can also be a gateway or be connected to one or more gateways (GWs), which provide access to a public switched telephone network (PSTN) or other communications facilities (not shown in FIG. 1). One message processing center 140 and four ground stations 110 are shown in FIG. 1 for clarity and ease of understanding.

Ground stations 110 are preferably communications devices that receive data from Non-GEO satellites 120 and GEO satellites 130. By way of example, ground stations 110 can be paging devices adapted to communicate with Non-GEO satellites 120 and GEO satellites 130. Ground stations 110 can be located anywhere on the surface of the earth or in the atmosphere above the earth.

In alternate embodiments, ground stations 110 are communications devices, which transmit data to and receive data from Non-GEO satellites 120 and GEO satellites 130. By way of example, ground stations 110 can be handheld, portable cellular telephones and two-way paging devices adapted to communicate with ground stations 1 10. Ground stations 1 10 can perform message-processing tasks, hand-off tasks and registration tasks in conjunction with Non-GEO satellites 120 and GEO satellites 130.

Links 115, 125, 135, 145, and 155 encompass a limited portion of the electromagnetic spectrum that is divided into numerous channels. Links 115, 125, 135, 145, and 155 can support any number of different modulation formats including Frequency Division Multiplex Access (FDMA), Time Division Multiple Access (TDMA) and/or Code Division Multiple Access (CDMA) or a combination thereof.

Non-GEO satellites 120 and GEO satellites 130 include array antennas (not shown). Each array antenna projects numerous discrete antenna beams (cells) on the surface of the earth. The pattern of cells which satellites 120, 130 project on the surface of the earth is referred to as a footprint. At least one message processing center 140 has information concerning the present location of certain ones of the footprints and has information concerning which ground stations 110 are within these footprints at a particular time.

In some locations, overlap exists between cells and footprints. For example, beams on a single satellite can cause cell overlap, and beams on one or more satellites can cause footprint overlap. In some cases, overlap occurs due to GEO and Non-GEO satellites covering the same location. The size of overlaps varies in response to the location of the satellites 120, 130 and the size and location of the beams. Overlap regions can be used advantageously in message-delivery and hand-off procedures. For example, overlap regions can be used to overcome shadowing problems.

At least one message processing center 140 is responsible for maintaining status data for ground stations 110. For example, status data can include location information, subscriber information and priority information. Subscriber information can include current members of individual groups assigned to the message processing center. Location information can include geopolitical boundary information. Message processing center 140 can also store satellite constellation information. For example, satellite constellation information can comprise satellite location with respect to time, along with broadcast coverage information with respect to time. In addition, diverse terrestrial-based communications networks, such as the PSTN, preferably access global message delivery system 100 through message processing center 140.

Figure 2:
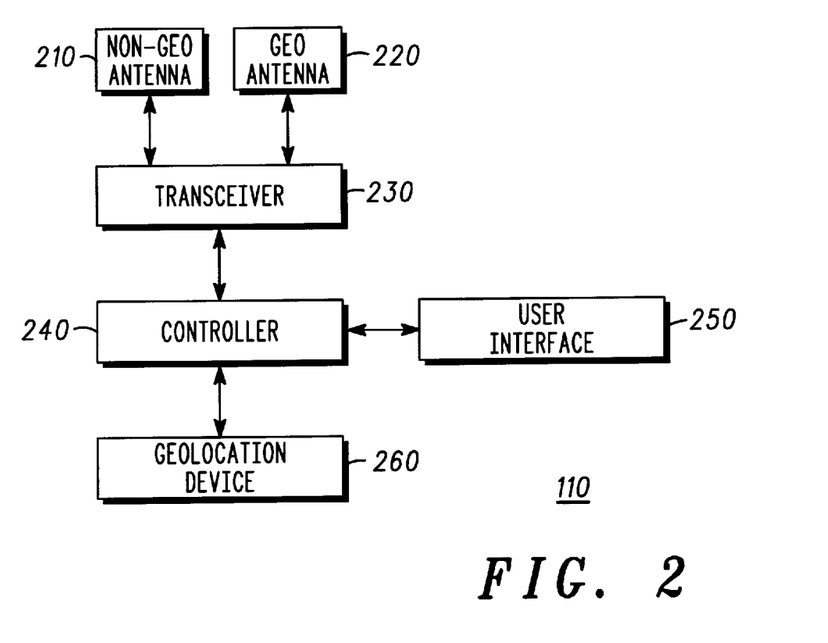
FIG. 2 shows a simplified block diagram of a ground station adapted to communicate with GEO and Non-GEO satellites in accordance with a preferred embodiment of the present invention.

FIG. 2 shows a simplified block diagram of a ground station adapted to communicate with GEO and Non-GEO satellites in accordance with a preferred embodiment of the present invention. Ground station 110 comprises Non-GEO antenna 210, GEO antenna 220, transceiver 230, controller 240, user interface 250, and geolocation device 260. Alternate embodiments can be envisioned which use a different number of antennas.

Non-GEO antenna 210 is coupled to transceiver 230. Non-GEO antenna 210 is used to establish link 115 (FIG. 1). Desirably, Non-GEO antenna 210 tracks at least one Non-GEO satellite as the satellite moves relative to ground station 110.

GEO antenna 220 is coupled to transceiver 230. GEO antenna 220 is used to establish link 135 (FIG. 1).

Transceiver 230, among other things, processes signals that are received using Non-GEO antenna 210 and/or GEO antenna 220. In a preferred embodiment, transceiver 230 processes these signals simultaneously. These signals include, among other things, message data. These signals are received via Non-GEO antenna 210 and/or GEO antenna 220. Controller 240 is coupled to transceiver 230. Controller 240 is used, among other things, to process message data received from transceiver 230.

User interface 250 is coupled to controller 240. In a preferred embodiment, user interface 250 includes, among other things, a display for presenting a visual message. The visual message can include the message data.

In a preferred embodiment, ground station 110 comprises at least one geolocation device 260. Geolocation device 260 is coupled to controller 240. Geolocation device 260 provides location data for ground station 110. In alternate embodiments, a geolocation device 260 is not included in ground station 110. In these cases, location data can be provided in other ways.

In a preferred embodiment, transceiver 230 also processes signals that are transmitted using Non-GEO antenna 210 and/or GEO antenna 220. These signals include, among other things, status data and location data. These signals are transmitted via Non-GEO antenna 210 and/or GEO antenna 220. In this embodiment, controller 240 processes the status data. In addition, controller 240 is used to process the location data that is provided by geolocation device 260.

In alternate embodiments, ground station 110 can also transmit response messages via either Non-GEO satellites 120 or GEO satellites 130. For example, a response message can indicate whether the ground station received a message.

Figure 3:
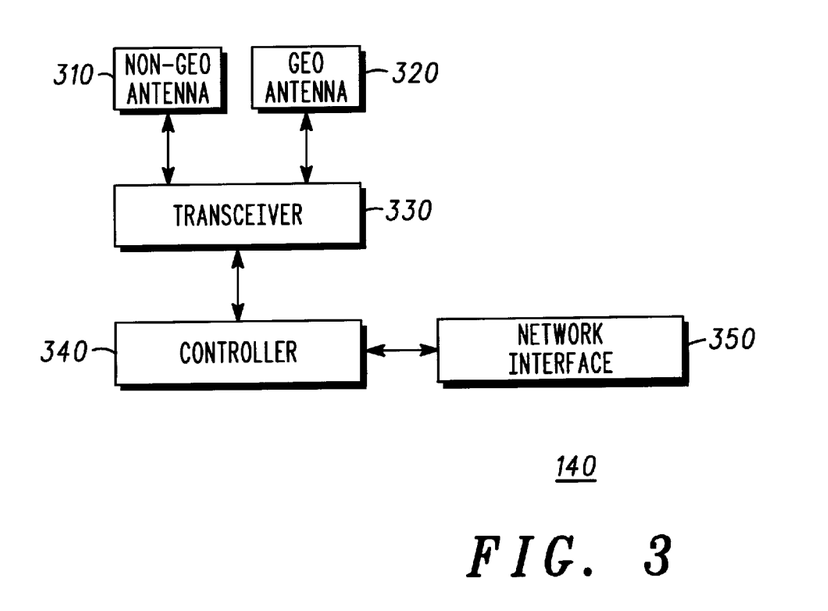
FIG. 3 shows a simplified block diagram of a message processing center adapted to communicate with GEO and Non-GEO satellites in accordance with a preferred embodiment of the present invention.

FIG. 3 shows a simplified block diagram of a message processing center adapted to communicate with GEO and Non-GEO satellites in accordance with a preferred embodiment of the present invention. Message processing center 140 comprises Non-GEO antenna 310, GEO antenna 320, transceiver 330, controller 340, and network interface 350. Alternate embodiments can be envisioned which use a different number of antennas.

Non-GEO antenna 310 is coupled to transceiver 330. Non-GEO antenna 310 is used to establish link 145 (FIG. 1). Desirably, Non-GEO antenna 310 tracks at least one Non-GEO satellite as the satellite moves relative to message processing center 140.

GEO antenna 320 is coupled to transceiver 330. GEO antenna 320 is used to establish link 155 (FIG. 1).

Transceiver 330, among other things, processes signals received via Non-GEO antenna 310 and/or GEO antenna 320 into digital data. Controller 340 is coupled to transceiver 330. Controller 2340 is used, among other things, to process digital data received from transceiver 330.

Network interface 350 is coupled to controller 340. Message processing center 140 can be connected to one or more system control centers using network interface 350. Message processing center 140 can also be connected to one or more GWs using network interface 350. In addition, access to a PSTN or other communications facilities can be provided using network interface 350.

In a preferred embodiment, message processing center 140 processes message information and sends message data to one or more ground stations 110 using either Non-GEO satellites 120 or GEO satellites 130. In alternate embodiments, message processing center 140 can also receive response messages via either Non-GEO satellites 120 or GEO satellites 130. For example, a response message can indicate whether or not the ground station received a message or be a quality of service indicator.

In a preferred embodiment of the present invention, a relatively large number of subscribers can be under the control of message processing center 140. Message processing center 140 determines how to efficiently use Non-GEO and GEO satellites to deliver messages to at least a portion of this relatively large number of subscribers.

Desirably, message processing center 140 determines current loading conditions for Non-GEO and GEO satellites so that message delivery takes place without detrimentally affecting the system. Messages are sent within a region defined by a subscriber's last registration location.

Network interface 350 enables controller 340 to exchange data and messages with at least one other network and/or system. Subscribers, which are external to the system at a particular time, can send and receive messages via message processing center 140 using network interface 350.

In a preferred embodiment, controller 340 processes information from those subscribers who request to register with the global message delivery system. Controller 340 determines location information for subscribers when they are registered with the system.

In a preferred embodiment, message processing center operates as shown below in FIG. 4 and FIG. 5.

In alternate embodiments, message processing center 140 processes the message information it receives to obtain a first portion of message data which is to be sent using a system comprising at least one GEO satellite. Message processing center 140 also processes the message information to obtain a second portion of the message data, which is to be sent using a system comprising at least one Non-GEO satellite. In addition, message processing center 140 processes the message information it receives to obtain a first part of a delivery area which is the part covered by the GEO system and processes the message information to obtain a second part of a delivery area which is the part covered by the Non-GEO system. Also, message processing center 140 processes the message information it receives to obtain a first set of ground stations which are in an area which is covered by the GEO system and processes the message information to obtain a second set of ground stations which are in an area which is covered by the Non-GEO system.

In an alternate embodiment, message processing center 140 establishes the first set so as to minimize power usage in said at least one GEO satellite, message processing center 140 establishes the second set using at least one difference between the number of ground stations and the number in the first set.

In another embodiment, message processing center 140 establishes the first set so as to minimize power usage in the Non-GEO satellites, and message processing center 140 establishes the second set using at least one difference between the number of ground stations and the number in the first set.

In another embodiment, message processing center 140 establishes the first set so as to minimize loading in the Non-GEO satellites, and message processing center 140 establishes the second set using at least one difference between the number of ground stations and the number in the first set.

In another embodiment, message processing center 140 establishes the first set so as to minimize loading in at least one GEO satellite, and message processing center 140 establishes the second set using at least one difference between the number of ground stations and the number in the first set.

Figure 4:
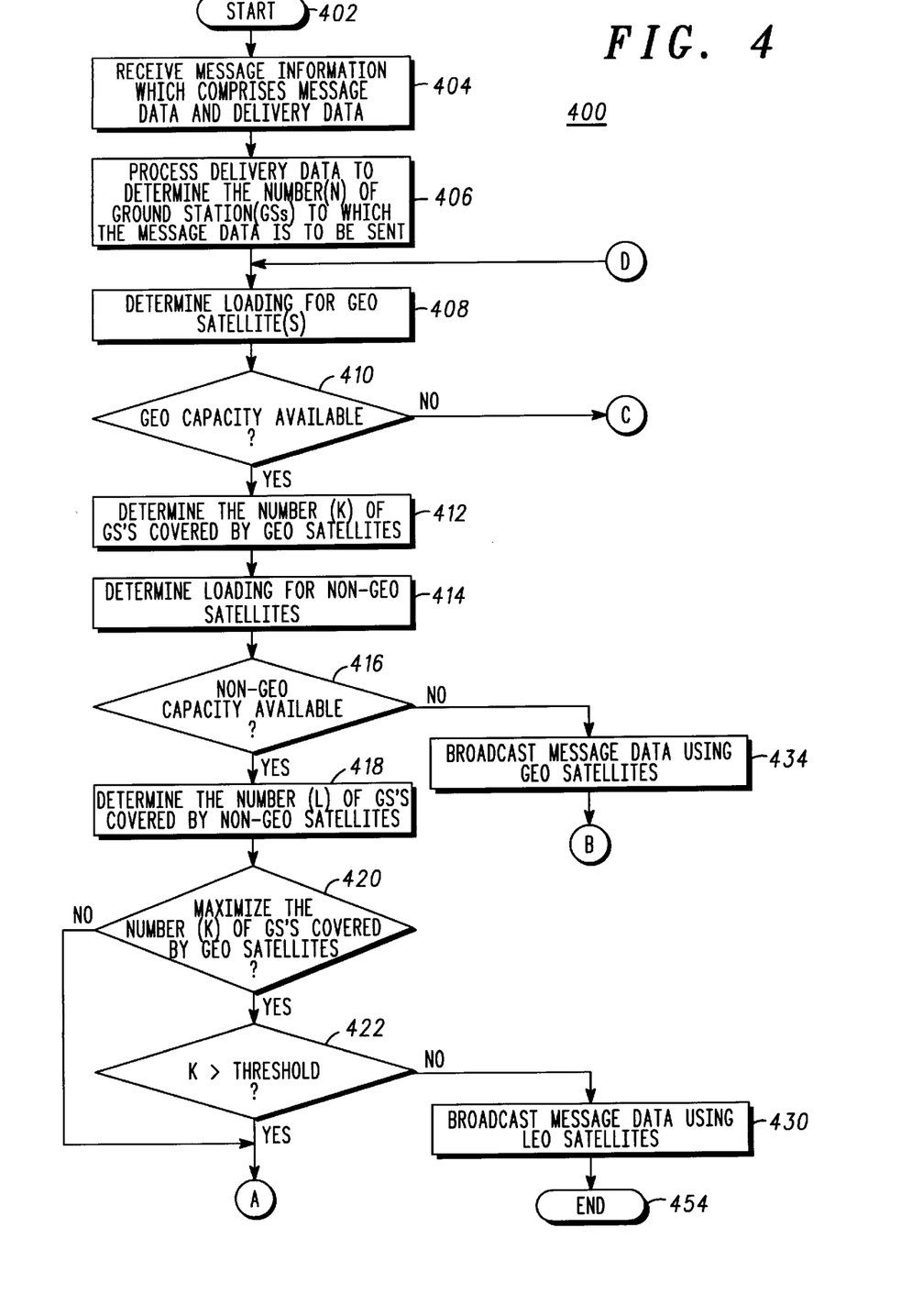
FIG. 4 and FIG. 5 illustrate a flowchart of a procedure performed by a message processing center in accordance with a preferred embodiment of the present invention.
Figure 5:
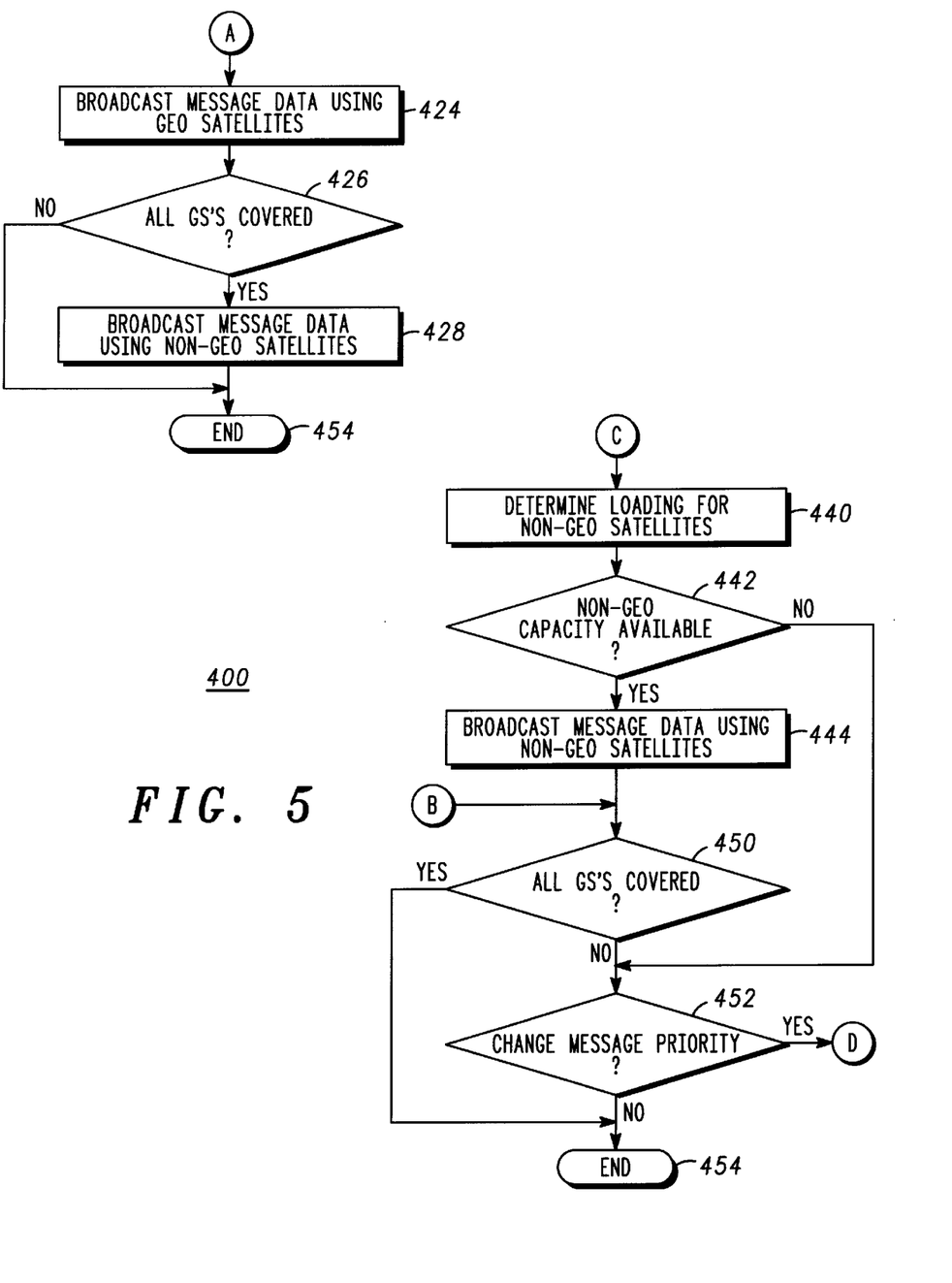

FIG. 4 and FIG. 5 illustrates a flowchart of a procedure performed by a message processing center in accordance with a preferred embodiment of the present invention. In a preferred embodiment, procedure 400 is performed by at least one message processing center.

In a preferred embodiment, at least one message processing center provides the communication links with the Non-GEO and GEO satellites in the global message delivery system. The subscribers in the global message delivery system use the message processing center to obtain messaging services from the global message delivery system. Procedure 400 starts in step 402. For example, step 402 may be the result of an operation within the global message delivery system or the result of a request from another communication system.

In step 404, the message processing center receives message information. The message information comprises message data and delivery data. The message data is data that is to be sent. The message processing center uses delivery data to determine where the message data is to be sent.

In step 406, the message processing center processes the message information to obtain the message data and the delivery data. The message processing center determines the number (N) of ground stations to which the message data must be sent. The message processing center also determines where the (N) targeted ground stations are located. In a global message delivery system, targeted ground stations can be anywhere on the surface of the earth. In addition, the message processing center determines the message priority level associated with the message data.

In a preferred embodiment, a message priority level is determined from the delivery data. Message priority levels are established by the system and are based on system information and subscriber information. For example, message priority levels can be established based on geopolitical boundaries, rate change boundaries, geophysical boundaries, and levels of service. Additionally, some subscribers can be given a lower priority or a higher priority for receiving message data if they are currently engaged in an on-going call. In addition, an emergency messages are given higher priority levels.

In an alternate embodiment, message priority levels are changed for subscribers with recently undelivered messages. In other embodiments, messages to a particular subscriber are given a higher priority. In this case, this is part of a premium service package offered which put these subscribers just below an emergency message. For example, a subscriber may want to receive a message as soon as possible no matter where he or she is located.

In step 408, the message processing center determines the current loading for the GEO satellites within the global message delivery system. The current loading is dependent on the number of communications service tasks that are being performed by the GEO satellites. Communications service tasks comprise call-processing tasks, hand-off tasks, and re-registration tasks. Loading information for the GEO satellites is self-determined. In another embodiment, loading information for GEO satellites is obtained from the global message deliver system. This information preferably includes data about the future (predicted) loading.

In step 410, a query is performed to determine if there is capacity available on the GEO satellites. Desirably, message priority levels, among other things, are used to determine available capacity. For example, some message data with high message priority levels can take precedence over some communication service task activity currently being performed by the GEO satellites. When capacity is available on the GEO satellites, then procedure 400 branches to step 412 and iterates as shown in FIG. 4 and FIG. 5. When capacity is not available on the GEO satellites, then procedure 400 branches to step 440 and iterates as shown in FIG. 4 and FIG. 5.

In step 412, the message processing center determines the number (K) of ground stations covered by the GEO satellites. Desirably, GEO satellites do not cover all of the (N) targeted ground stations, and Non-GEO satellites can cover some of the targeted ground stations. In some situations, GEO satellites can cover all of the targeted ground stations.

In a preferred embodiment, the message processing center has access to data that describes the broadcast coverage area of the GEO satellites with respect to time. The message processing center determines the location of the (N) targeted ground stations in relation to the broadcast coverage area of one or more of the GEO satellites using location data for the GEO satellites and the (N) targeted ground stations. In alternate embodiments, the message processing center stores satellite system topological data that predicts the relative location of the GEO and Non-GEO satellites with respect to one another and with respect to earth at given points in time.

In step 414, the message processing center determines the current loading for the Non-GEO satellites within the global message delivery system. The current loading is dependent on the number of communications service tasks that are being performed by the Non-GEO satellites. Communications service tasks comprise call-processing tasks, hand-off tasks, and re-registration tasks. Loading information for the Non-GEO satellites is self-determined. In another embodiment, loading information is obtained from the global message delivery system. This information preferably includes data about the future (predicted) loading.

In step 416, a query is performed to determine if there is capacity available on the Non-GEO satellites. Desirably, message priority levels, among other things, are used to determine available capacity. For example, some message data with high message priority levels can take precedence over some communication service task activity currently being performed by the Non-GEO satellites. When capacity is available on the Non-GEO satellites, then procedure 400 branches to step 418 and iterates as shown in FIG. 4 and FIG. 5. When capacity is not available on the Non-GEO satellites, then procedure 400 branches to step 434 and iterates as shown in FIG. 4 and FIG. 5.

In step 434, the message data is sent to at least one of the GEO satellites. Step 434 is performed when capacity is not available on the Non-GEO satellites. Procedure 400 continues with step 450.

In step 418, the message processing center determines the number (L) of ground stations covered by the Non-GEO satellites. In a preferred embodiment, the message processing center has access to data that describes the broadcast coverage area of the Non-GEO satellites with respect to time. The message processing center determines the location of the (N) targeted ground stations in relation to the broadcast coverage area of one or more of the Non-GEO satellites using location data for the Non-GEO satellites and the (N) targeted ground stations. Desirably, the Non-GEO satellites cover all of the (N) targeted ground stations.

In step 420, a query is performed to determine if the number (K) of ground stations being serviced by the GEO satellites should be maximized. When the number of ground stations being serviced by the GEO satellites should be maximized, then procedure 400 branches to step 422 and iterates as shown in FIG. 4 and FIG. 5. When the number of ground stations being serviced by the GEO satellites should not be maximized, then procedure 400 branches to step 424 and iterates as shown in FIG. 4 and FIG. 5.

In step 422, a query is performed to determine if the number (K) of ground stations being serviced by the GEO satellites is greater than a threshold. When the number (K) of ground stations being serviced by the GEO satellites is greater than the threshold, then procedure 400 branches to step 424 and iterates as shown in FIG. 4 and FIG. 5. When the number of ground stations being serviced by the GEO satellites is not greater than the threshold, then procedure 400 branches to step 430 and iterates as shown in FIG. 4 and FIG. 5.

Desirably the threshold is set based on the transmit power for the one or more GEO satellites being used to transmit the message data. The threshold specifies a given number of ground stations that need to be covered by the GEO satellite to ensure that it is more power efficient to broadcast using the GEO satellite.

In step 430, the message data is sent to the Non-GEO satellites. Step 428 is performed when the number of ground stations being serviced by the GEO satellites is not greater than the threshold. Procedure 400 continues with step 450.

In step 424, the message data is sent to the GEO satellites by the message processing center.

In step 426, a query is performed to determine if the GEO satellites have covered all of the targeted ground stations. When the GEO satellites have covered all of the targeted ground stations, then procedure 400 branches to step 454 and ends (as shown in FIG. 4 and FIG. 5). When not all of the targeted ground stations have been covered, then procedure 400 branches to step 428.

In step 428, the message data is sent to the Non-GEO satellites if the GEO satellites have not reached all of the targeted ground stations. Procedure 400 continues to step 454 and ends.

In step 440, the message processing center determines the current loading for the Non-GEO satellites within the global message delivery system. Step 440 is performed when capacity is not available on the GEO satellites (step 410).

The current loading is dependent on the number of communications service tasks that are being performed by the Non-GEO satellites. Loading information for the Non-GEO satellites can be self-determined or obtained from the global message delivery system. This information can include data about the future (predicted) loading.

In step 442, a query is performed to determine if there is capacity available on the Non-GEO satellites. Desirably, message priority levels, among other things, are used to determine available capacity on the Non-GEO satellites. For example, some message data with high message priority levels could take precedence over some communication service task activity currently being performed by the Non-GEO satellites.

When capacity is available on the Non-GEO satellites, then procedure 400 branches to step 444 and iterates as shown in FIG. 4 and FIG. 5. When capacity is not available on the Non-GEO satellites, then procedure 400 branches to step 452 and iterates as shown in FIG. 4 and FIG. 5. In this case, capacity is not available at the present time on GEO satellites or Non-GEO satellites.

In step 444, the message data is sent to at least one of the Non-GEO satellites. Procedure 400 continues with step 450.

In step 450, a query is performed to determine if all of the targeted ground stations have been covered. When all of the targeted ground stations have been covered, then procedure 400 branches to step 454 and ends (as shown in FIG. 4 and FIG. 5). When not all of the targeted ground stations have been covered, then procedure 400 branches to step 452.

In step 452, a query is performed to determine if the message priority level should be changed. When the message priority level should be changed, then the message priority level is changed, and procedure 400 branches back to step 408 and iterates as shown in FIG. 4 and FIG. 5. When the message priority level should not be changed, then procedure 400 branches to step 454 and ends. In alternate embodiments, a message priority level change can be accomplished by delaying for a fixed amount of time and attempting to deliver the message data later.

Those skilled in the art will recognize that the steps described above do not need to be performed in the sequence listed above.

In alternate embodiments, the message processing center can determine the location of each targeted ground station with respect to a redundant coverage area. A redundant coverage area is covered by a GEO satellite and a Non-GEO satellite. For example, this is done to predict and prevent blocking. In addition, the message processing center can determine if redundant coverage should be provided in certain areas using combinations of GEO and Non-GEO satellites.

The method and apparatus of the present invention provides a means for delivering messages using GEO and Non-GEO satellites. This reduces the number of undelivered messages, optimizes the amount of power used to send the messages, and can provide redundant coverage areas.

What is claimed is:

1. A method for broadcasting message s to a plurality of ground stations in a wide area using a Geosynchronous (GEO) satellite, a plurality of Non-GEO satellites, and a control center, said method comprising the steps of:
   a) processing in formation, received by said control center, into message data and delivery data, wherein step a) further comprises the steps of:
      a1) identifying a group of said plurality of ground stations, said group having a number N of said plurality of ground stations; and
      a2) determining locations for said number N of said plurality of ground stations in said group;
   b) broadcasting said message data to a first set of said plurality of ground stations using said GEO satellite, wherein step b) further comprises the steps of:
      b1) determining loading of said GEO satellite;
      b2) determining if capacity is available on said GEO satellite;
      b3) when capacity is available on said GEO satellite, identifying a number K of said plurality of ground stations in a first set in said group, said number K being within a broadcast coverage area of said GEO satellite;
      b4) determining if said number K should be maximized;
      b5) sending said message data to said GEO satellite when said number K should not be maximized; and
      b6) comparing said number K to a threshold, when said number K should be maximized; and
   c) broadcasting said message data to a second set of said plurality of ground stations using at least one of said plurality of Non-GEO satellites, wherein said method further comprises the steps of:
      c1) determining loading of said at least one of said plurality of Non-GEO satellites;
      c2) determining if capacity is available on said at least one of said plurality of Non-GEO satellites; and
      c3) when capacity is available on said at least one of said plurality of Non-GEO satellites, identifying a number L of said plurality of ground stations in a second set in said group, said number L being within a broadcast coverage area of said at least one of said plurality of Non-GEO satellites.

2. The method as claimed in claim 1, wherein said method further comprises the step of:
   c4) when capacity is not available on said at least one of said plurality of Non-GEO satellites, determining if a message priority level should be changed.

3. The method as claimed in claim 2, wherein said method further comprises the steps of:
   c5) when said message priority level should be changed, changing said message priority level; and
   c6) branching to step b1).

4. The method as claimed in claim 2, wherein said method further comprises the steps of:
   c5) when said message priority level should not be changed, refraining from changing said message priority level; and
   c6) terminating said method.

5. The method as claimed in claim 1, wherein said method further comprises the step of:
   c4) when capacity is available on said at least one of said plurality of Non-GEO satellites, sending said message data to said at least one of said plurality of Non-GEO satellites.

6. The method as claimed in claim 5, wherein said method further comprises the step of:
   c5) determining if said message data has been sent to said number N of said plurality of ground stations.

7. The method as claimed in claim 6, wherein said method further comprises the step of:
   c6) when said message data has been sent to said number N of said plurality of ground stations, terminating said method.

8. The method as claimed in claim 6, wherein said method further comprises the step of:
   c6) when said message data has not been sent to said number N of said plurality of ground stations, determining if a message priority level should be changed.

9. The method as claimed in claim 8, wherein said method further comprises the steps of:
   c7) when said message priority level should be changed, changing said message priority level; and
   c8) branching to step b1).

10. The method as claimed in claim 8, wherein said method further comprises the steps of:
    c7) when said message priority level should not be changed, refraining from changing said message priority level; and
    c8) terminating said method.

11. The method as claimed in claim 1, wherein said method further comprises the steps of:
    b7) sending said message data to said GEO satellite when said number K exceeds said threshold;
    b8) determining if said message data has been sent to said number N of said plurality of ground stations;

b9) when said message data has been sent to said number N of said plurality of ground stations, terminating said method; and b10) when said message data has not been sent to said number N of said plurality of ground stations, sending said message data to said at least one of said plurality of Non-GEO satellites.

12. The method as claimed in claim 11, wherein said method further comprises the step of:

b8) sending said message data to said at least one of said plurality of Non-GEO satellites when said number K does not exceed said threshold.

* * * * *